United States Patent
Li et al.

(10) Patent No.: US 12,293,284 B2
(45) Date of Patent: May 6, 2025

(54) META COOPERATIVE TRAINING PARADIGMS

(71) Applicant: Baidu USA, LLC, Sunnyvale, CA (US)

(72) Inventors: Dingcheng Li, Sammamish, WA (US); Haiyan Yin, Singapore (SG); Xu Li, Beijing (CN); Ping Li, Bellevue, WA (US)

(73) Assignee: Baidu USA, LLC, Sunnyvale, CA (US)

( * ) Notice: Subject to any disclaimer, the term of this patent is extended or adjusted under 35 U.S.C. 154(b) by 1164 days.

(21) Appl. No.: 17/136,054

(22) Filed: Dec. 29, 2020

(65) Prior Publication Data
US 2021/0241099 A1 Aug. 5, 2021

Related U.S. Application Data

(60) Provisional application No. 62/970,638, filed on Feb. 5, 2020.

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC ................................ G06N 3/08; G06N 3/045
See application file for complete search history.

(56) References Cited

U.S. PATENT DOCUMENTS

| | | | |
|---|---|---|---|
| 10,140,544 B1* | 11/2018 | Zhao | G06N 20/00 |
| 2019/0122072 A1* | 4/2019 | Cricri | G06V 20/46 |
| 2020/0097554 A1* | 3/2020 | Rezagholizadeh | G06N 3/08 |

(Continued)

OTHER PUBLICATIONS

Ngoc-Trung Tran et.al. (hereinafter Tran) Dist-GAN: An Improved GAN using Distance Constraints, Proceedings of the European Conference on Computer Vision (ECCV), 2018, pp. 370-385., (Year: 2018).*

(Continued)

*Primary Examiner* — Li B. Zhen
*Assistant Examiner* — Tirumale K Ramesh
(74) *Attorney, Agent, or Firm* — Oppedahl Patent Law Firm LLC

(57) ABSTRACT

Generative adversarial models have several benefits; however, due to mode collapse, these generators face a quality-diversity trade-off (i.e., the generator models sacrifice generation diversity for increased generation quality). Presented herein are embodiments that improve the performance of adversarial content generation by decelerating mode collapse. In one or more embodiments, a cooperative training paradigm is employed where a second model is cooperatively trained with the generator and helps efficiently shape the data distribution of the generator against mode collapse. Moreover, embodiments of a meta learning mechanism may be used, where the cooperative update to the generator serves as a high-level meta task and which helps ensures the generator parameters after the adversarial update stay resistant against mode collapse. In experiments, tested employments demonstrated efficient slowdown of mode collapse for the adversarial text generators. Overall, embodiments outperformed the baseline approaches with significant margins in terms of both generation quality and diversity.

21 Claims, 12 Drawing Sheets

(56) References Cited

U.S. PATENT DOCUMENTS

| | | | |
|---|---|---|---|
| 2020/0336507 A1* | 10/2020 | Lee | G06F 21/577 |
| 2021/0073630 A1* | 3/2021 | Zhang | G06N 3/08 |
| 2021/0303925 A1* | 9/2021 | Hofmann | G06V 20/10 |

OTHER PUBLICATIONS

Sutton et al., "Policy gradient methods for reinforcement learning with function approximation," In NIPS, 1057-1063, 2000. (7pgs).

Ulyanov et al., "Instance Normalization: The missing ingredient for fast stylization," arXiv preprint arXiv:1607.08022, 2017. (6pgs).

Wen et al., "Semantically Conditioned LSTM-based Natural Language Generation for Spoken Dialogue Systems," arXiv preprint arXiv:1508.01745, 2015. (11pgs).

R. J. Williams "Simple statistical gradient-following algorithms for connectionist reinforcement learning," Machine learning 8(3-4):229-256, 1992 (28 pgs).

Xu et al., "DP-GAN: diversity-promoting generative adversarial network for generating informative and diversified text," arXiv preprint arXiv:1802.01345v2, 2018. (8pgs).

Yin et al., "Knowledge transfer for deep reinforcement learning with hierarchical experience replay," In AAAI, 1640-1646, 2017. (7pgs).

Yu et al.,"SeqGAN: Sequence generative adversarial nets with policy gradient," In AAAI, 2852-2858, 2017. (7pgs).

Zhang et al., "Adversarial feature matching for text generation," In ICML, 2017. (10pgs).

Zhu et al., "Texygen: A benchmarking platform for text generation models," arXiv preprint arXiv:1802.01886, 2018. (4pgs).

Xu et al., "Diversity-Promoting Gan: A Cross-Entropy Based Generative Adversarial Network for Diversified Text Generation," arXiv preprint arXiv:1802.01345v3, 2018. (10pgs).

Guo et al., "Long text generation via adversarial training with leaked information," In AAAI, 2018. (8 pgs).

Hinton et al., "Distilling the knowledge in a neural network," arXiv preprint arXiv:1503.02531, 2015. (9 pgs).

Jang et al., "Categorical reparameterization with gumbel-softmax," In ICLR, 2017. (12 pgs).

Kingma et al., Adam: A method for stochastic optimization. arXiv preprint arXiv:1412.6980, 2017. (15pgs).

Kusner et al., "Gans for sequences of discrete elements with the gumbel-softmax distribution," arXiv preprint arXiv:1611.04051, 2016. (6 pgs).

Lamb et al., "Professor forcing: A new algorithm for training recurrent networks," In NIPS, 2016. (9 pgs).

Li et al.,"Deep reinforcement learning for dialogue generation," In EMNLP, 2016. (11 pgs).

Li et al., "Deep recurrent generative decoder for abstractive text summarization," In EMNLP, 2091-2100, 2017. (10 pgs).

Li et al., "Learning to generalize: Meta-learning for domain generalization," In AAAI, 3490-3497, 2018. (8 pgs).

Li et al., "Multi-agent discussion mechanism for natural language generation," In AAAI, 6096-6103, 2019. (8 pgs).

Al-Shedivat et al., "Continuous adaptation via meta-learning in nonstationary and competitive environments," In ICLR, 2018. (21pgs).

Arjovsky et al., "Wasserstein generative adversarial networks," In ICML, 2017. (10 pgs).

Bahdanau et al., "Neural machine translation by jointly learning to align and translate," In ICLR, 2015. (15pgs).

Caccia et al., "Language gans falling short," arXiv preprint arXiv:1811.02549, Feb. 19, 2020. (18pgs).

Che et al., "Maximum-likelihood augmented discrete generative adversarial networks," arXiv preprint arXiv:1702.07983, 2017. (11pgs).

Che et al., "Microsoft coco captions: Data collection and evaluation server," arXiv preprint arXiv:1504.00325, 2015. (7pgs).

Che et al., "Adversarial text generation via feature-mover's distance," In 32nd Conference on Neural Information Processing Systems (NeurIPS), 2018. (12pgs).

Fedus et al., "Maskgan: better text generation via filling in the ," In ICLR, 2018. (17pgs).

Finn et al., "Model-agnostic meta-learning for fast adaptation of deep networks," In ICML, 2017. (10 pgs).

Goodfellow et al., "Generative adversarial nets," In NIPS, 2014. (9 pgs).

Lin et al., "Adversarial ranking for language generation," In NIPS, 2017. (11 pgs).

Liu et al., "Query-Oriented multi-document summarization via unsupervised deep learning," Proceedings of the 26th AAAI Conference on Artificial Intelligence, 2012. (7pgs).

Lu et al., "Neural Text Generation: Past, Present and Beyond," arXiv preprint arXiv:1803.07133, 2018. (7pgs).

Lu et al., "CoT: Cooperative Training for Generative Modeling of Discrete Data,"Proceedings of the 36 th International Conference on Machine Learning, 2019. (9 pgs).

Nie et al., "Relgan: Relational generative adversarial networks for text generation," In ICLR, 2019. (20pgs).

Radford et al., "Unsupervised representation learning with deep convolutional generative adversarial networks," arXiv preprint arXiv:1511.06434, 2016. (16pgs).

Rajeswar et al., "Adversarial generation of natural language," arXiv preprint arXiv:1705.10929, 2017. (11pgs).

Rusu et al.,"Policy Distillation," arXiv preprint arXiv:1511.06295, 2016. (13pgs).

Sun et al., "Logician and orator: Learning from the duality between language and knowledge in open domain," In EMNLP, 2119-2130, 2018. (12pgs).

Sutskever et al., "Sequence to Sequence Learning with Neural Networks," In NIPS, 2014. (9pgs).

\* cited by examiner

TABLE 2

| Method | BLEU-2 | BLEU-3 | BLEU-4 | BLEU-5 | NLL_gen |
|---|---|---|---|---|---|
| MLE | 0.731 | 0.497 | 0.305 | 0.189 | 0.718 |
| SeqGAN | 0.745 | 0.498 | 0.294 | 0.180 | 1.082 |
| RankGAN | 0.743 | 0.467 | 0.264 | 0.156 | 1.344 |
| LeakGAN | 0.746 | 0.528 | 0.355 | 0.230 | 0.679 |
| RelGAN (100) | 0.849 ± 0.030 | 0.687 ± 0.047 | 0.502 ± 0.048 | 0.331 ± 0.044 | 0.756 ± 0.054 |
| RelGAN (1000) | 0.814 ± 0.012 | 0.634 ± 0.020 | 0.455 ± 0.020 | 0.303 ± 0.020 | 0.655 ± 0.048 |
| Meta-CoTGAN (100) | 0.858 ± 0.003 | 0.692 ± 0.005 | 0.518 ± 0.007 | 0.363 ± 0.009 | 0.578 ± 0.036 |
| Meta-CoTGAN (1000) | 0.842 ± 0.011 | 0.675 ± 0.019 | 0.502 ± 0.026 | 0.349 ± 0.024 | 0.583 ± 0.028 |

FIG. 8

TABLE 3

| Method | BLEU-2 | BLEU-3 | BLEU-4 | BLEU-5 | NLL_gen |
|---|---|---|---|---|---|
| MLE | 0.768 | 0.473 | 0.240 | 0.126 | 2.382 |
| SeqGAN | 0.777 | 0.491 | 0.261 | 0.138 | 2.773 |
| RankGAN | 0.727 | 0.435 | 0.209 | 0.101 | 3.345 |
| LeakGAN | 0.826 | 0.645 | 0.437 | 0.272 | 2.356 |
| RelGAN (100) | 0.881 ± 0.013 | 0.705 ± 0.019 | 0.501 ± 0.023 | 0.319 ± 0.018 | 2.482 ± 0.031 |
| RelGAN (1000) | 0.837 ± 0.012 | 0.654 ± 0.010 | 0.435 ± 0.011 | 0.265 ± 0.011 | 2.285 ± 0.025 |
| Meta-CoTGAN (100) | 0.882 ± 0.014 | 0.734 ± 0.017 | 0.542 ± 0.016 | 0.358 ± 0.015 | 2.299 ± 0.011 |
| Meta-CoTGAN (1000) | 0.868 ± 0.015 | 0.703 ± 0.014 | 0.500 ± 0.016 | 0.318 ± 0.016 | 2.205 ± 0.053 |

FIG. 10

TABLE 4

| Method | BLEU-2 | BLEU-3 | BLEU-4 | BLEU-5 | NLL_gen |
|---|---|---|---|---|---|
| RelGAN (100) | 0.849 ± 0.030 | 0.687 ± 0.047 | 0.502 ± 0.048 | 0.331 ± 0.044 | 0.756 ± 0.054 |
| Meta-CoTGAN (100) | 0.858 ± 0.003 | 0.692 ± 0.005 | 0.518 ± 0.007 | 0.363 ± 0.009 | 0.578 ± 0.036 |
| Meta-CoTGAN$^{cot-off}$ (100) | 0.824 ± 0.011 | 0.647 ± 0.022 | 0.466 ± 0.028 | 0.315 ± 0.022 | 0.580 ± 0.031 |
| Meta-CoTGAN$^{meta-off}$ (100) | 0.835 ± 0.013 | 0.661 ± 0.016 | 0.487 ± 0.016 | 0.338 ± 0.014 | 0.587 ± 0.019 |
| RelGAN (1000) | 0.814 ± 0.023 | 0.634 ± 0.020 | 0.455 ± 0.023 | 0.303 ± 0.020 | 0.655 ± 0.048 |
| Meta-CoTGAN (1000) | 0.842 ± 0.011 | 0.675 ± 0.019 | 0.502 ± 0.026 | 0.349 ± 0.024 | 0.583 ± 0.028 |
| Meta-CoTGAN$^{cot-off}$ (1000) | 0.824 ± 0.007 | 0.643 ± 0.009 | 0.497 ± 0.013 | 0.324 ± 0.015 | 0.582 ± 0.017 |
| Meta-CoTGAN$^{meta-off}$ (1000) | 0.817 ± 0.021 | 0.638 ± 0.027 | 0.465 ± 0.025 | 0.319 ± 0.018 | 0.589 ± 0.022 |

FIG. 11

META COOPERATIVE TRAINING PARADIGMS

CROSS-REFERENCE TO RELATED APPLICATION

This patent application is related to and claims priority benefit under 35 U.S.C. § 119 (e) to commonly-owned U.S. Pat. App. No. 62/970,638, filed on 5 Feb. 2020, entitled "META COOPERATIVE TRAINING PARADIGM FOR IMPROVING ADVERSARIAL TEXT GENERATION," and listing Dingcheng Li, Haiyan Yin, Xu Li, and Ping Li as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for adversarial training for generative models.

B. Background

Neural networks have achieved great successes in many domains, such as computer vision, natural language processing, recommender systems, etc. One type of neural network model is a generative model, which is used to generate content, such as text and images. Generative models are trained to learn the true data distribution from the training set and are capable of generating new data points when the training is completed. In recent years, they have been successfully applied to a wide range of applications, including image generation, stylization, semi-supervised classification, and natural language generation. One area of application is the emerging task of text generation, which is typically modeled as a sequential discrete data generation process. Such tasks play a pivot role in many real-world applications, such as machine translation, text summarization, and dialogue systems.

The training of sequential text generation models has been greatly relying on applying teacher forcing over autoregressive models, i.e., optimizing with maximum likelihood estimation (MLE). However, training the generative models with teacher forcing would suffer from exposure bias, i.e., the models are fed to their predicted data rather than the ground-truth data at inference time and thus result in generating poor samples due to the accumulated error. To address the exposure bias issue, a major on-going research for text generation centers on utilizing adversarial training techniques to derive better text generation models. Generally, such attempts could be classified into the following two strands: the first line of approaches combine generative adversarial network (GAN) with reinforcement learning (RL), denoted as RL-based; the second line of approaches solely play the two-player adversarial game without using RL, denoted as RL-free.

Both RL-based and RL-free text generation approaches suffer from mode collapse, a notoriously known challenge for training GAN-based models. That is, as the adversarial training progresses, the generated distribution tends to contrast towards generating subset of modes for the data. As a result, the generator outputs repeated sentences and thus no longer expressively represents the data generating distribution. Such effect has been quantitatively evaluated in a recent study, which shows that the entropy of the generator's output distribution would experience a clear drop when moving from MLE training to adversarial training phase. To derive better text generation models with GAN-based techniques, one critical thing is to achieve a better quality-diversity trade-off by efficiently slowing down the mode collapse of the adversarial generator, i.e., to let the generator get abundant gradient information from adversarial update for making its output more real (i.e., improve quality) while bearing with small mode collapse effect (i.e., decrease diversity). However, limited number of existing RL-based or RL-free approaches explicitly consider dealing with mode collapse of GAN training.

Accordingly, what is needed are approaches that explicitly tackle the challenge of mode collapse for adversarial training, resulting in an improved text generation model.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 8 contains Table 2, which presents evaluation results on a dataset, according to embodiments of the present disclosure. The results are averaged over 6 runs (random seeds), and for the $NLL_{gen}$ (last column), the smaller the better.

FIG. 10 contains Table 3, which presents evaluation results on Dataset 2, according to embodiments of the present disclosure. The results are averaged over 6 runs, and for the $NLL_{gen}$ (last column), the smaller the better.

FIG. 11 contains Table 4, which presents ablation study result on Dataset 1, according to embodiments of the present disclosure. The evaluation comprised a Meta-CoTGAN embodiment when the cooperative training part and meta optimization were turned off, respectively. Reported scores were derived from 6 random seeds.

DETAILED DESCRIPTION OF EMBODIMENTS

Figure 1:
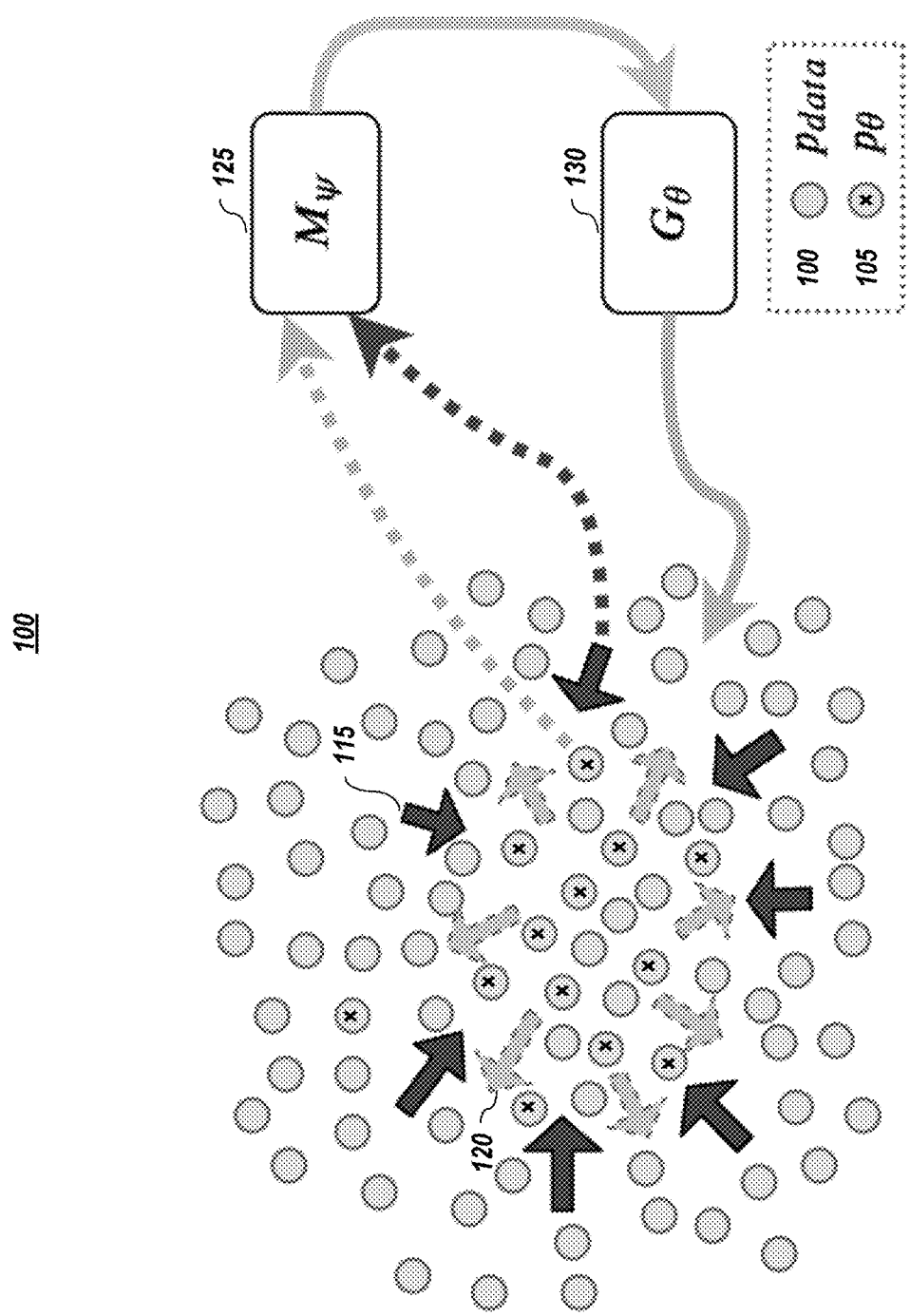
FIG. 1 depicts a high-level overview of a cooperative training procedure, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that, although embodiments described herein may be within the context of text generation, aspects of the present disclosure are not so limited. Accordingly, the aspects of the present disclosure may be applied or adapted for use in other contexts and for generating other content.

A. General Introduction

Training generative models that can generate high-quality text with sufficient diversity is an important open problem for Natural Language Generation (NLG) community. Recently, generative adversarial models have been applied extensively on text generation tasks, where the adversarially trained generators alleviate the exposure bias experienced by conventional maximum likelihood approaches and result in promising generation quality. However, due to the notorious defect of mode collapse for adversarial training, the adversarially trained generators face a quality-diversity trade-off, i.e., the generator models tend to sacrifice generation diversity severely for increasing generation quality.

Presented herein are embodiments of novel approaches, which improve the performance of adversarial content generation via efficiently decelerating mode collapse of the adversarial training. To this end, embodiments of a cooperative training paradigm are presented, where a language model is cooperatively trained with the generator, and, in one or more embodiments, the language model is utilized to efficiently shape the data distribution of the generator against mode collapse. Moreover, instead of engaging the cooperative update for the generator in a principled way, in one or more embodiments, a meta learning mechanism is formulated, where the cooperative update to the generator serves as a high-level meta task, with an intuition of ensuring the parameters of the generator after the adversarial update would stay resistant against mode collapse. In the experiment, it is demonstrated that embodiments can efficiently slow down the pace of mode collapse for the adversarial text generators. Overall, embodiments are able to outperform the baseline approaches with significant margins in terms of both generation quality and diversity in the testified domains.

Besides the conventional approaches of training language models with teacher forcing, current approaches for text generation may be generally classified as RL-based or RL-free approaches. Most RL-based approaches formulate text generation as a Markov Decision Process (MDP). Often, the generator is updated by policy gradient algorithm or its variants using reward signals derived from GAN's discriminator. Prominent examples for this type of approaches include SeqGAN, RankGAN, LeakGAN, and MaskGAN. The noisy reward signals derived from the discriminator model tends to make such RL-based models suffer from high-variance gradients to update the generator's parameters. Besides high-variance of gradient, the RL-based approaches also face the difficulties brought by partial sequence evaluation, slow learning, and sensitive hyperparameters. Considering such challenges for the RL-based approaches, embodiments may be thought to reside in, but not restricted to, the category of RL-free approach. Prominent examples of RL-free approaches include TextGAN, FM-GAN, GSGAN, and Rel-GAN. Such approaches feed the generator with low variance gradient and often lead to more stable training.

Most of the adversarial text generation models are firstly pretrained by MLE, and then are continuously optimized by adversarial training under either RL-based or RL-free mechanism. When switched from MLE training to adversarial training phase, the generator models for both RL-based and RL-free approaches would suffer from a mode collapse issue. A core intuition of one or more embodiments herein is to utilize a cooperatively trained language model to decelerate the mode collapse of adversarial training. While a similar intuition of utilizing language model to facilitate adversarial text generation aligns with other works, there are stark differences. In "DP-GAN: Diversity-Promoting Generative Adversarial Network for Generating Informative and Diversified Text," by J. Xu, X. Ren, J. Lin, and X. Sun (available at arXiv preprint arXiv: 1802.01345 (2018)), the discriminator for adversarial training is modeled as a language model, which maximizes the probability for real data and minimizes that for generated data. Furthermore, the output derived from the language model is adopted as reward signal to promote generation diversity under an RL-based set-up. In "CoT: Cooperative training for generative modeling of discrete data," by Sidi Lu, Lantao Yu, Siyuan Feng, Yaoming Zhu, and, Weinan Zhang in *Proceedings of the 36th International Conference on Machine Learning, PMLR* 97:4164-4172 (2019) (hereinafter "Lu et al. 2019"), where a language model is trained online to offer a target distribution for minimizing the Jensen-Shannon divergence between the real data distribution and the generated distribution. In contrast, one or more embodiments may be considered to adopt a similar strategy to train the language model, but the cooperative training for the generator model is vastly different, among other differences. For example, embodiments comprise a distinct meta learning setup to optimize the cooperative training loss for the generator.

Overall, there are at least three contributions presented by in this patent document. First, embodiments of a novel cooperative training approach are presented, where a language model is used to efficiently shape the output distribution of the adversarial text generator. Embodiments of this approach efficiently slow the mode collapse of the adversarial text generator and thus lead the text generation towards a better quality-diversity trade-off. Second, to optimize the cooperative training loss for the generator, embodiments of a novel meta-learning mechanism are presented herein. In one or more embodiments, the cooperative training task serves as a meta task and the adversarial training serves as a base task. Thus, embodiments ensure that the generator parameters after the adversarial update are resistant to mode collapse. Third, extensive experiments conducted on synthetic and real-world datasets demonstrate that embodiments are able to produce better text generation models in terms of both the quality and the diversity.

B. Preliminaries

The task of text generation is typically modelled as sequential discrete data generation process. Let $\{x_j\}_{j=1}^N$ be the N data points drawn from an underlying data generating distribution $p_{data}$. Each data point is represented as a sequence of discrete tokens: $x=(y_1, \ldots, y_T)$, where $y_i$ denotes the i-th token and T denotes the length of the sequence. Let $G_\theta$ denote the generator model parameterized by $\theta$. Conventional text generation approaches typically train a language model with maximum likelihood estimation (MLE) as follows:

$$\min_\theta \mathbb{E}_{x \sim p_{data}}[-\log G_\theta(x)],$$

where the probability of each sequence x is represented in an autoregressive manner:

$$G_\theta(x) = \prod_{i=1}^T G_\theta(y_i | y_{<i}; \theta),$$

with $y_{<i}$ denoting the sequence of previous tokens $y_1, \ldots, y_{i-1}$.

The approaches utilizing GANs for text generation attempt to play a two-player game between the generator $G_\theta$ and a discriminator D. Let the discriminator D be parameterized by $\phi$. Under the adversarial set-up, the generator $G_\theta$ is trained to generate realistic sentences given samples from $p_{data}$, and the discriminator $D_\phi$ attempts to distinguish between $G_\theta$'s generating distribution $p_\theta$ and the real data distribution $p_{data}$. Thus, the above-mentioned process may be formulated as an adversarial training mechanism as follows:

$$\min_\theta \max_\phi \mathbb{E}_{x \sim p_{data}}[\log(D_\phi(x))] + \mathbb{E}_{x \sim p_\theta}[\log(1 - D_\phi(G_\theta(x)))], \quad (1)$$

where the generator $G_\theta$ and discriminator $D_\phi$ attempt to minimize and maximize the function, respectively. The adversarial loss in Equation (1) may be denoted in terms of the generator model and the discriminator model as $\mathcal{L}_{adv}(\theta)$ and $\mathcal{L}_{adv}(\phi)$, respectively.

With the autoregressive generation process, the i-th token $y_i$ is generated by sampling from the generator's output distribution, conditioned on its previous tokens $y_{<i}$. Performing such sampling introduces considerable difficulty for the generator to utilize the discriminator's prediction outcome. That is, the backpropagation route for adversarial loss, i.e., $$\frac{\partial \mathcal{L}_{adv}}{\partial \theta} = \sum_{i=0}^{T-1} \frac{\partial \mathcal{L}_{adv}}{\partial y_{t+1}} \frac{\partial y_{t+1}}{\partial \theta},$$

becomes non-differentiable with respect to the generator's parameters θ, since $$\frac{\partial y_{t+1}}{\partial \theta}$$

would be zero due to the sampling. To overcome the above issue, the RL-based approaches mostly rely on the REINFORCE algorithm or its variants to derive the gradient to optimize the generator, where the discriminator's predictions may be utilized to derive reward signals. The RL-free approaches often relax the non-differentiable sampling function by some continuous approximations, such as soft-argmax or gumbel-softmax. In one or more embodiments, a gumbel-softmax relaxation, which models the effect of sampling as introducing noise to the input so that the outputs become continuous and differentiable, may be used. Specifically, the noise is modeled by a Gumbel distribution, which is formed as follows:

$$g_t^{(i)} = -\log(-\log(U_t^{(i)})), \text{ with } U_t^{(i)} \sim \text{Uniform}(0,1),$$

where $g_t^{(i)}$ denotes the Gumbel noise to be applied to the i-th logits. With the Gumbel noise, the token for next step $y_{t+1}$ may be derived in a deterministic manner:

$$y_{t+1} = \text{one\_hot}\left(\underset{1 \le i \le V}{\text{argmax}}\left(o_t^{(i)} + g_t^{(i)}\right)\right),$$

where $o_t \in \mathbb{R}^V$ denotes the logits output by the generator for sampling token $y_{t+1}$, and V denotes vocabulary size. To make the discriminator's loss differentiable, the argmax operator is replaced by a softmax function σ(•), i.e., $\hat{y}_{t+1} = \sigma(\beta(o_t + g_t))$, where β is a real-valued temperature hyperparameter, with β>0.

C. Methodology Embodiments

Language generators trained with adversarial training mechanism (both RL-based and RL-free approaches) suffer from mode collapse when switched from teacher forcing to the adversarial training phase. In this section, embodiments of a novel meta cooperative training methodology to overcome such challenges. Overall, an objective is to achieve a better quality-diversity trade-off for the language generators via decelerating mode collapse of their adversarial training. That is, embodiments of the methodology allow the generator to get abundant gradient information from the adversarial training for increasing generation quality, while sacrificing little in terms of generation diversity. Overall, in one or more embodiments, a language model is employed to decelerate the mode collapse of the generator's output distribution. In one or more embodiments, the language model is cooperatively trained with the generator $G_\theta$ during adversarial training. The output of language model over samples from real data distribution $p_{data}$ may be used to shape the generator's output distribution. Furthermore, the supervision may be formulated with a meta optimization setup.

1. Cooperative Training Formulation Embodiments

Embodiments of a cooperative training paradigm that engages an interleaved training procedure for an adversarial generator $G_\theta$, an adversarial discriminator $D_\phi$, and a language model $M_\psi$, where ψ denotes the parameters for the language model, is presented in this section.

FIG. 1 depicts a high-level overview of a cooperative training procedure, according to embodiments of the present disclosure. A generator $G_\theta$ 130 trained with adversarial training tends to suffer from mode collapse (graphically depicted by short dark arrows facing inward, e.g., arrow 115). That is, when the generator $G_\theta$ 130 is trained by the adversarial loss, its generation diversity tends to progressively decrease in an attempt to increase the generation quality. To overcome such a challenge, a language model $M_\psi$ 125 may be cooperatively trained. In one or more embodiments, the language model 125 poses a supervision over $G_\theta$'s output distribution towards preserving desirable generation probability for the real data thereby decelerating mode collapse (which are graphically depicted as the short, light colored, dashed outline arrows facing outward, e.g., arrow 120). The language model may be trained from a mixed distribution of samples from $p_\theta$ and $p_{data}$. In one or more embodiments, the supervision from language model to the language generator works on samples from $p_{data}$. The generator 130 may be updated by the adversarial loss and the cooperative training loss.

During the cooperative training process, the language model may be optimized consistently by MLE loss. To offer a smoothly changing target distribution for the generator, in one or more embodiments, the language mode is trained with data from a mixture distribution with balanced samples from real data and generated data, e.g., $$\frac{1}{2}(p_{data} + p_\theta),$$

although other mixtures may be used. An embodiment of the cooperative training loss $\mathcal{L}_{cot}(\psi)$ for updating the language model with MLE is formally defined in Equation (2), below. It may be interpreted as minimizing the direct KL divergence between $M_\psi$ and an optimal mixture density model M* which has a distribution of $$\frac{1}{2}(p_{data} + p_\theta),$$

$$\nabla_\psi \mathcal{L}_{cot}(\psi) = -\frac{1}{2}\nabla_\psi (\underset{x \sim p_{data}}{\mathbb{E}}\log(M_\psi(x)) + \underset{x \sim p_\theta}{\mathbb{E}}\log(M_\psi(x))) \quad (2)$$

$$= \nabla_\psi \underset{x \sim p_{M^*}}{\mathbb{E}}\left(\log\frac{M^*(x)}{M_\psi(x)}\right) = \nabla_\psi KL(M^* \| M_\psi),$$

Consistently updating the language model $M_\psi$ with samples from real data and using the teacher forcing loss may make it experience mild mode collapse effect. Thus, its output predictions may offer an effective supervision over the generator $G_\theta$'s output distribution for decelerating mode collapse. Moreover, updating $M_\psi$ with the mixture distribution, compared to only using the real data distribution, would offer a target distribution that is smoothly changing towards the generator's update, which turns out to be more beneficial. Formally, the cooperative training loss for the generator model is proposed as follows:

$$\mathcal{L}_{cot}(\theta) = KL(M_\psi(x) \| G_\theta(x)) \tag{3}$$

$$= \sum_{i=1}^{T} M_\psi(y_i) \log \frac{M_\psi(y_i)}{G_\theta(y_i)},$$

where $y_i$ is the i-th token from the sequence x. Thus, the KL-loss distills the output distribution given by the language model to the generator. When considering the mode collapse, in one or more embodiments, the interest is in preserving the distribution for the real data from $p_{data}$, rather than those from $p_\theta$. Therefore, when optimizing Equation (3), in one or more embodiments, only samples from the real data distribution $p_{data}$ are adopted to compute the KL-loss. With the above cooperative training loss, the gradient for updating the generator's parameters may be derived as follows:

$$\nabla_\theta \mathcal{L}_{cot}(\theta) = \nabla_\theta \left( \sum_{i=1}^{T} M_\psi(y_i) \log \frac{M_\psi(y_i)}{G_\theta(y_i)} \right)$$

$$= -\sum_{i=1}^{T} M_\psi(y_i) \nabla_\theta \log(G_\theta(y_i)).$$

As such, the effect of applying cooperative training on the generator may be considered as equivalent to increasing the density of the real data in a weighted manner.

2. Meta Cooperative Optimization Embodiments

In this section, embodiments of a meta learning paradigm to interleave the optimization of the adversarial training loss $\mathcal{L}_{adv}(\theta)$ and the cooperative training loss $\mathcal{L}_{cot}(\theta)$ for the generator model parameters are presented. Unlike the conventional meta learning approaches that work on achieving faster learning, task generalization, or deriving adaptive models, an intuition here is to preserve the generative distribution for the adversarial text generator model to decelerate its mode collapse.

To this end, in one or more embodiments, optimizing the adversarial loss $\mathcal{L}_{adv}(\theta)$ is modelled as a base task, and optimizing the cooperative training loss $\mathcal{L}_{cot}(\theta)$ is modeled as the meta task. With such setting, in one or more embodiments, the meta optimization scheme ensures that after optimizing the generator parameter values $\theta$ with the adversarial training loss $\mathcal{L}_{adv}(\theta)$ for increasing generation quality, the resultant parameters would demonstrate considerable resistance towards mode collapse, i.e., increasing generation quality while preserving considerable generation diversity.

Formally, in one or more embodiments, one gradient update on the generator parameters $\theta$ may first be performed by optimizing the base task loss:

$$\theta' = \theta - \alpha \nabla_\theta \mathcal{L}_{adv}(\theta).$$

Then, in one or more embodiments, new samples from the real data distribution are obtained: $x \sim p_{data}$ and inference the meta-loss $\mathcal{L}_{cot}(\theta')$ for the real samples on the updated parameters $\theta'$. The meta gradient may be weighted by $\lambda > 0$ and added to the base task gradient to update the parameters $\theta$. Finally, the adversarial update under embodiments of the meta cooperative training paradigm may be formulated as below:

$$\mathcal{L}_D = \max_\phi \mathcal{L}_{adv}(\phi)$$

$$\mathcal{L}_G = \min_\theta (\mathcal{L}_{adv}(\theta) + \lambda \mathcal{L}_{cot}(\theta'))$$

$$\mathcal{L}_M = \min_\psi \mathcal{L}_{cot}(\psi)$$

An example full methodology embodiment for meta cooperative training is presented in Methodology 1, below.

| Methodology 1-Meta Cooperative Training Embodiment |
|---|
| Input: Generator ($G_\theta$), Discriminator ($D_\phi$), Language Model ($M_\psi$), learning rates ($\alpha$, $\beta$, and $\gamma$), training data distribution ($p_{data}$) |
| Output: Generator ($G_\theta$) |
| 1. Initialize (e.g., randomly) model parameter $\theta$ and $\phi$ |
| 2. Pretrain $G_\theta$ with samples from $p_{data}$ |
| 3. Assign the weights to $M_\psi$ from $G_\theta$ |
| 4. while not done do |
| 5.    Sample $x_r \sim p_{data}$ |
| 6.    Generate $x_f$ with $G_\theta$ |
| 7.    Compute adversarial loss $\mathcal{L}_{adv}(\theta)$ |
| 8.    $\theta' = \theta - \alpha \nabla_\theta \mathcal{L}_{adv}(\theta)$ |
| 9.    Compute $M_\psi(x_r)$ with language model |
| 10.    $g_m = \nabla_\theta \lambda \mathcal{L}_{cot}(M_\psi(x_r), G_{\theta'}(x_r))$    ▷ Compute meta gradient |
| 11.    $\theta = \theta - \alpha(\nabla_\theta \mathcal{L}_{adv}(\theta) + \lambda g_m)$    ▷ Generator update |
| 12.    $\phi = \phi - \beta \nabla_\phi \mathcal{L}_{adv}(\phi)$    ▷ Discriminator update |
| 13.                                               ▷ Language model update |
| 14. end while |
| 15. return Generator ($G_\theta$) |

Figure 2:
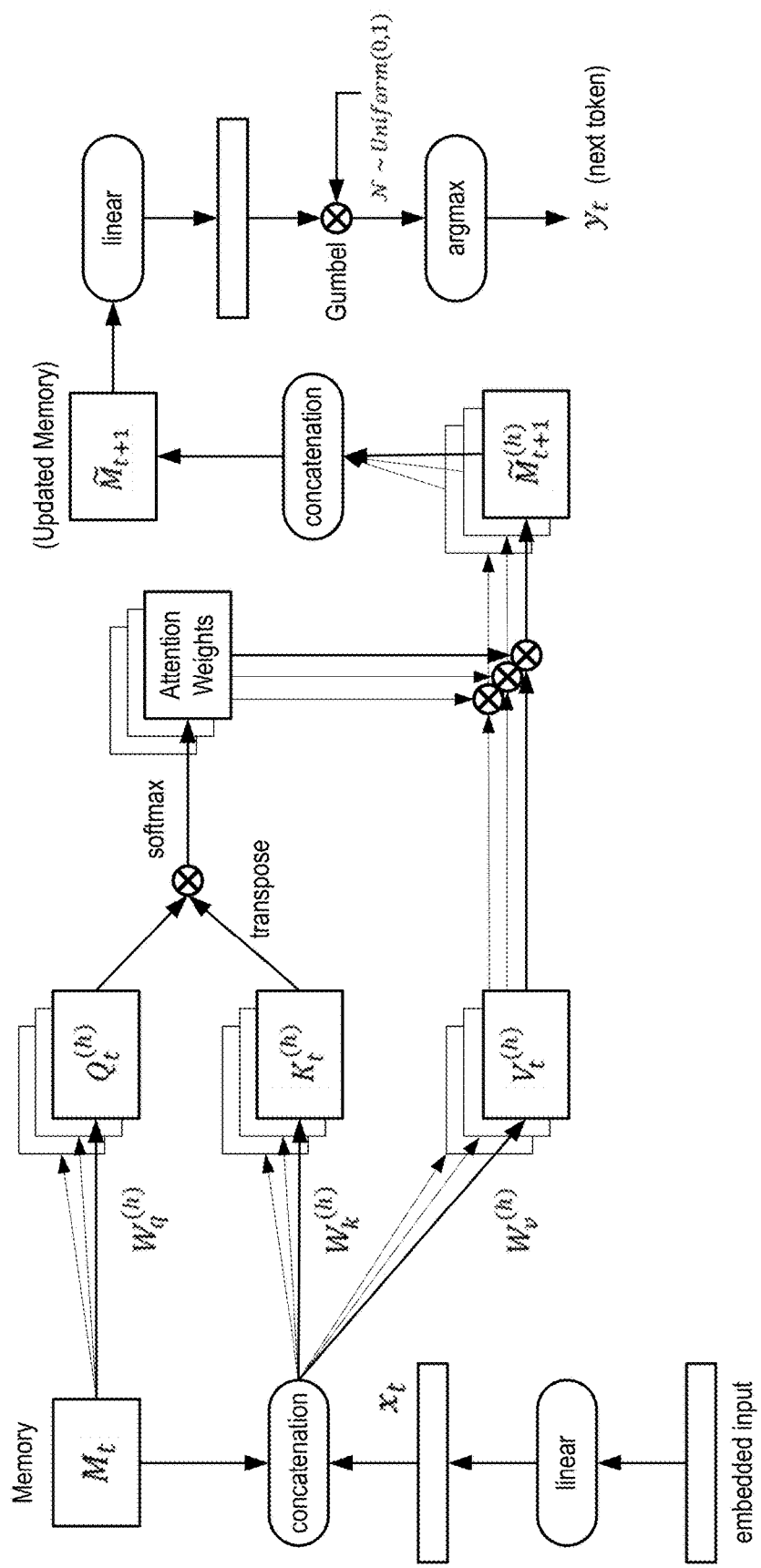
FIG. 2 depicts an example generation system, according to embodiments of the present disclosure.

FIG. 2 depicts an example generation system with relational memory, according to embodiments of the present disclosure. After incorporating new observation $x_t$, the system updates the memory $M_t$ to $M_{t+1}$ by applying a self-attention mechanism. Note that each row of the memory matrix $M_t$ is a memory slot, and $Q_t^{(h)}$ denotes the queries, $K_t^{(h)}$ denotes the keys, and $V_t^{(h)}$ denotes the values. It shall also be noted that the language model may also be a same or similar system as the generator.

Figure 3:
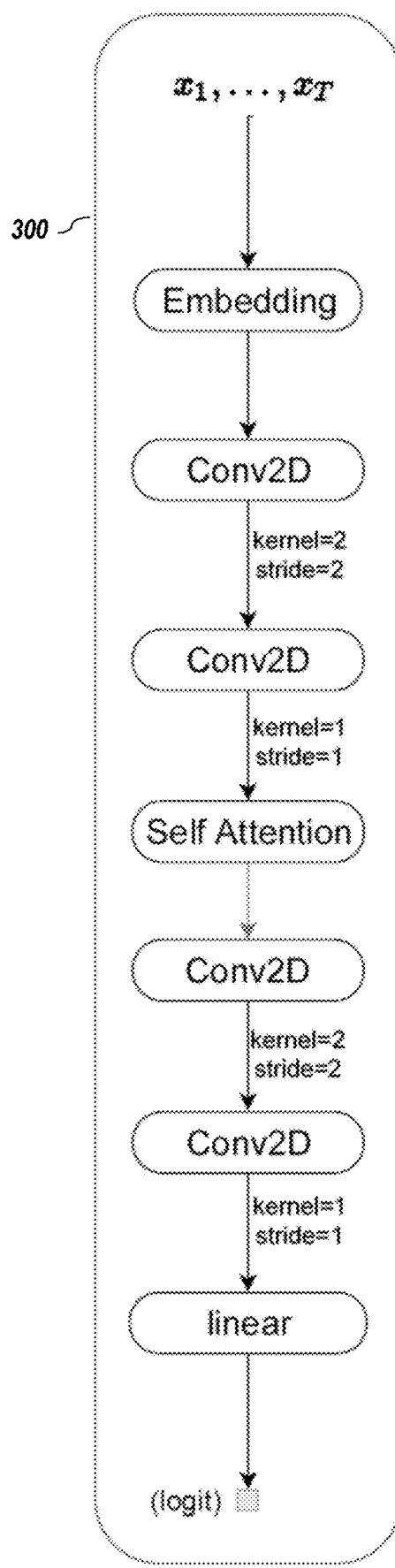
FIG. 3 depicts an example discriminator system, according to embodiments of the present disclosure.

FIG. 3 depicts an example discriminator system, according to embodiments of the present disclosure. In one or more embodiments, the discriminator 300 comprises an embedding layer, one or more convolution layers, a self-attention layer, one or more convolution layers, a linear layer, and a logit output.

Figure 4:
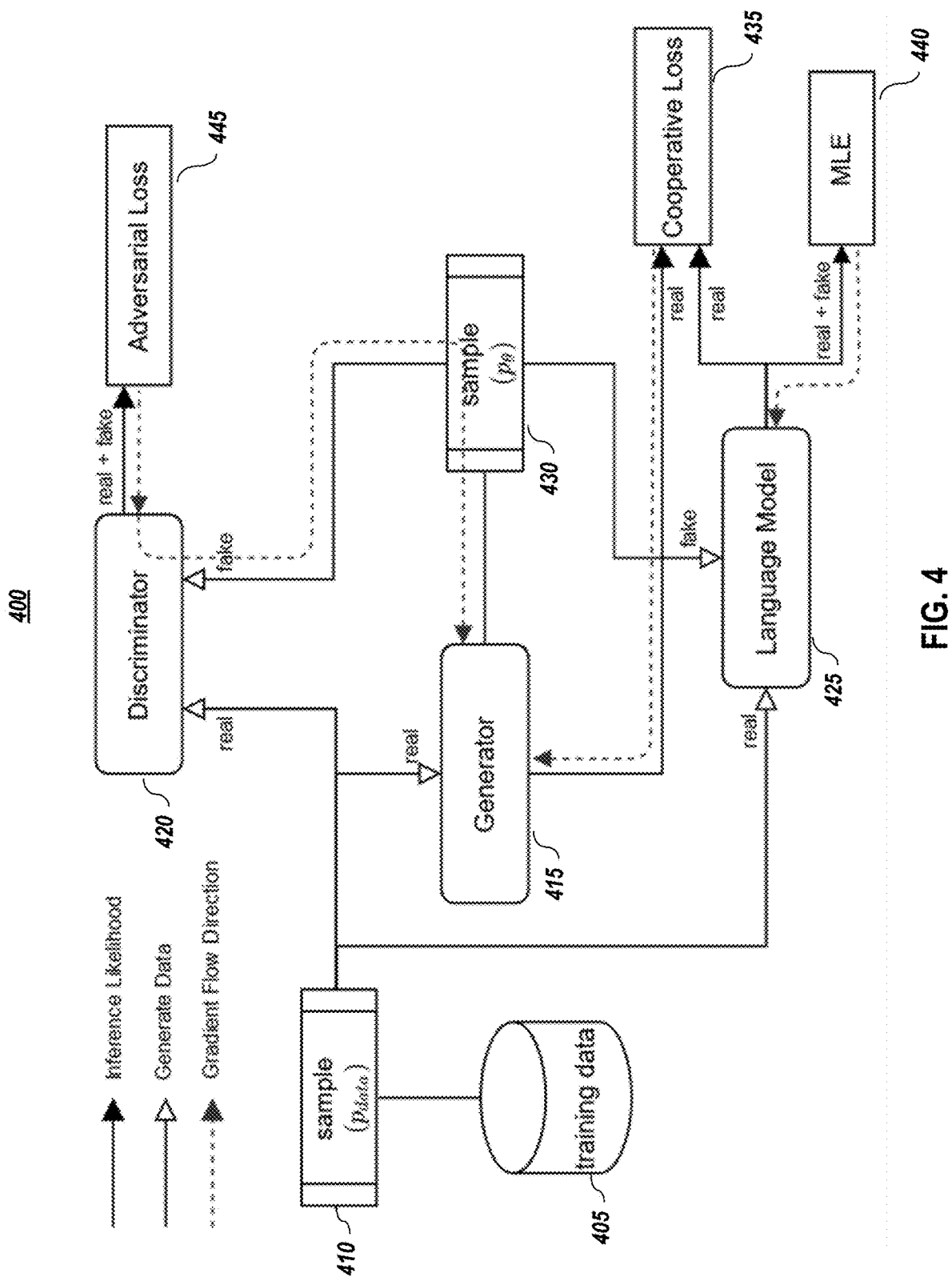
FIG. 4 depicts an overview of a GAN system and Meta-CoTGAN data flow methodology, according to embodiments of the present disclosure.
Figure 5:
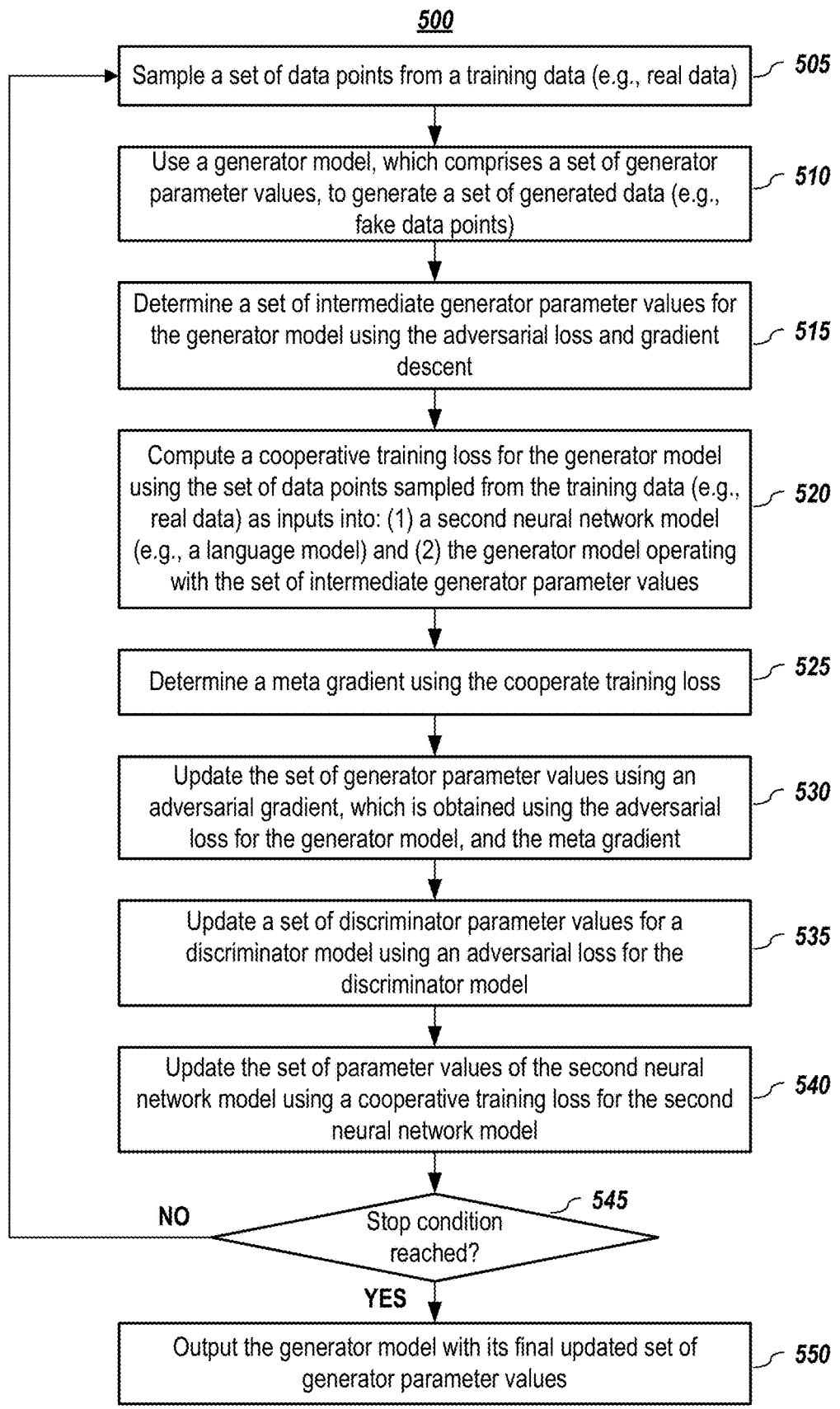
FIG. 5 depicts a Meta-CoTGAN methodology for training a generator model, according to embodiments of the present disclosure.

FIG. 4 depicts an overview of a GAN system, according to embodiments of the present disclosure, and FIG. 5 depicts a Meta-CoTGAN methodology for training a generator model, according to embodiments of the present disclosure. In one or more embodiments, a computer-implemented method for training a generator may comprise the following steps. A set of data points 410 from a training data 405 may be sampled (505), and using a generator model 415, which comprises a set of generator parameter values, a set of generated data points (e.g., fake data points) may be generated (510). Using the discriminator 420, which receives real and fake data points and tries to differentiate between the two, an adversarial loss for the generator model may be computed using an adversarial training loss function 445. The adversarial loss for the discriminator model and the adversarial loss for the generator model may be obtained by using a min-max loss function.

In one or more embodiments, the adversarial loss and gradient descent can then be used (515) to determine a set of intermediate generator parameter values for the generator model.

In one or more embodiments, using the set of data points sampled from the training data as inputs into: (1) a second neural network model (e.g., language model 425), which comprises a second neural network model set of parameter values, and (2) the generator model 415 that uses the set of intermediate generator parameter values, a cooperative training loss for the generator model is computed (520). This cooperative training loss may then, in one or more embodiments, be used to determine (525) a meta gradient.

In one or more embodiments, the set of generator parameter values are updated (530) using an adversarial gradient, which is obtained using the adversarial loss for the generator model, and the meta gradient. The second neural network model set of parameter values of the second neural network model may also be updated (540) using a cooperative training loss for the second neural network model; and a set of discriminator parameter values for a discriminator model may be updated (535) using an adversarial loss for the discriminator model.

In one or more embodiments, the processing may repeat until a stop condition is reached (545); otherwise, if a stop condition has been reached, the generator model with its final updated set of generator parameter value is output (550) and may be used for generation. An example deployment of a trained generator is discussed next with respect to FIG. 6 (below).

In one or more embodiments, the process of FIG. 5 may also include initialization steps. For example, at least the set of generator parameter values of the generator model and the set of discriminator parameter values of the discriminator model may be initialized, and the generator model may be pretrained using training data, the generator model, and the discriminator model. In one or more embodiments, the pretraining may be done using min-max adversarial training.

In one or more embodiments, as noted previously, the second neural network model and the generator model may share a same neural network structure. Thus, in one or more embodiments, at least some of the set of generator parameter values from the pretrained generator model may be used as parameter values for the second neural network model. It should also be noted that second neural network model first be initialized with different values. For example, all of the models may first be initialized with random values.

In one or more embodiments, the step of updating the second neural network model set of parameter values of the second neural network model using a cooperative training loss may comprise using a maximum likelihood estimation (MLE) loss function. Equivalently, the step of updating the second neural network model set of parameter values of the second neural network model using a cooperative training loss comprises minimizing a Kullback-Leibler divergence between the second neural network model using the set of data points sampled from the training data and the second neural network model using a mixture of data points sampled from the training data and data points sampled from data points that were generated by the generator model. In one or more embodiments, the mixture may be an equal number or approximately equal number of data points from the training data and data points which were generated by the generator model.

Figure 6:
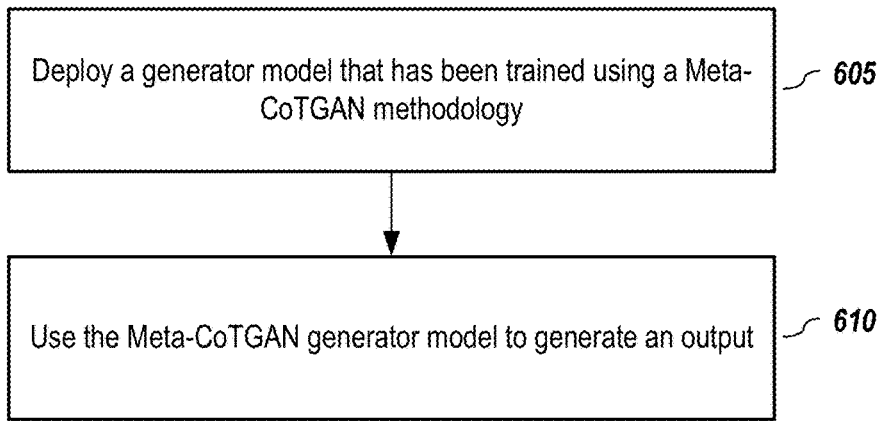
FIG. 6 depicts a method for using a generator model that has been trained using a Meta-CoTGAN methodology, according to embodiments of the present disclosure.

FIG. 6 depicts a method for using a generator model that has been trained using a Meta-CoTGAN methodology, according to embodiments of the present disclosure. Given a generator model that has been trained using a Meta-CoTGAN methodology embodiment, the generator model may be deployed (605) for generating content. Thus, the Meta-CoTGAN generator model, having been trained and deployed, can be used (610) to generate an output.

D. Experimental Results

Embodiments of the meta cooperative training generative adversarial networks may be denoted generally, for convenience, as Meta-CoTGAN. In the experiment section, first, an embodiment is compared with another, but different, cooperative training counterpart, CoT (Lu et al. 2019) on a synthetic dataset. Then, the comparison result between an embodiment and several RL-based and RL-free approaches on two text generation datasets (Dataset 1 and Dataset 2) are shown.

It shall be noted that these experiments and results are provided by way of illustration and were performed under specific conditions using a specific embodiment or embodiments; accordingly, neither these experiments nor their results shall be used to limit the scope of the disclosure of the current patent document.

1. Implementation Details

Embodiments were implemented on top of RelGAN (proposed by Weili Nie, Nina Narodytska, and Ankit Patel in "RelGAN: Relational Generative Adversarial Networks For Text Generation," in *International Conference on Learning Representations (ICLR)*, 2019, which is incorporated by reference in herein in its entirety), an RL-free adversarial text generation model that is among the state-of-the-art approaches. It shall be noted that other generative adversarial networks may be used. Specifically, Rel-GAN adopts a relational memory to model the long-distance dependencies among the input tokens, and a gumbel-softmax relaxation to overcome the non-differentiable issue in the generator training. The relational memory adopts 1 memory slot, multi-head attention with 2 heads, and the attention key size is set to be 512. The language model for cooperative training adopts the identical network architecture as the generator, and the weights for the generator's parameters are assigned to the language model after pretraining. The discriminator adopts multiple representations with size to be 64. In test embodiments, Adam was used as the optimization algorithm for updating all the model parameters.

2. Evaluation Metrics

For comparison, the various models were evaluated in terms of sample quality and sample diversity simultaneously. Following most of today's text generation works, the sample quality was evaluated by the BLEU score metrics when tested on datasets, and $NLL_{oracle}$ loss when tested on the synthetic dataset. The $NLL_{oracle}$ loss was defined as the negative log likelihood derived from the target LSTM model for the data generated by Ge. The sample diversity was evaluated in terms of $NLL_{gen}$ loss, which was in the following form:

$$NLL_{gen} = -\mathbb{E}_{x_{1:K}} \log P_\theta(x_1, \ldots, x_K),$$

where the density of the real data was evaluated on the generator model. Thus, models with better sample diversity would have a broader coverage over the real data space and result in lower $NLL_{gen}$ loss. Models that suffer from severe mode collapse would no longer represent the real data well and result in higher $NLL_{gen}$ loss.

3. Baseline Models

To evaluate the efficiency of a tested embodiment, MLE was considered as well as the RL-based baselines, including SeqGAN, RankGAN, and LeakGAN. Also, comparison was also done with the most related RL-free baseline RelGAN. During evaluation, the temperature settings proposed in Rel-GAN were followed, and the results for the tested method embodiment when evaluated with temperature values of 100 and 1000 are presented herein.

4. Synthetic Dataset

The first evaluation domain was a synthetic oracle dataset. The experiment engaged a randomly initialized long short-term (LSTM) model as the target model to simulate real-world sequences and generate data from real data distribution. The synthetic experiments were conducted with the sequence length set to be 20. An objective for experimenting in this domain was to compare the tested embodiment with its closest cooperative training counterpart CoT. While these two models may be thought to adopt a similar way to train the language model, the efficiency of adopting the respective cooperative training losses on the generator model as proposed in these two methods was investigated.

Figure 7:
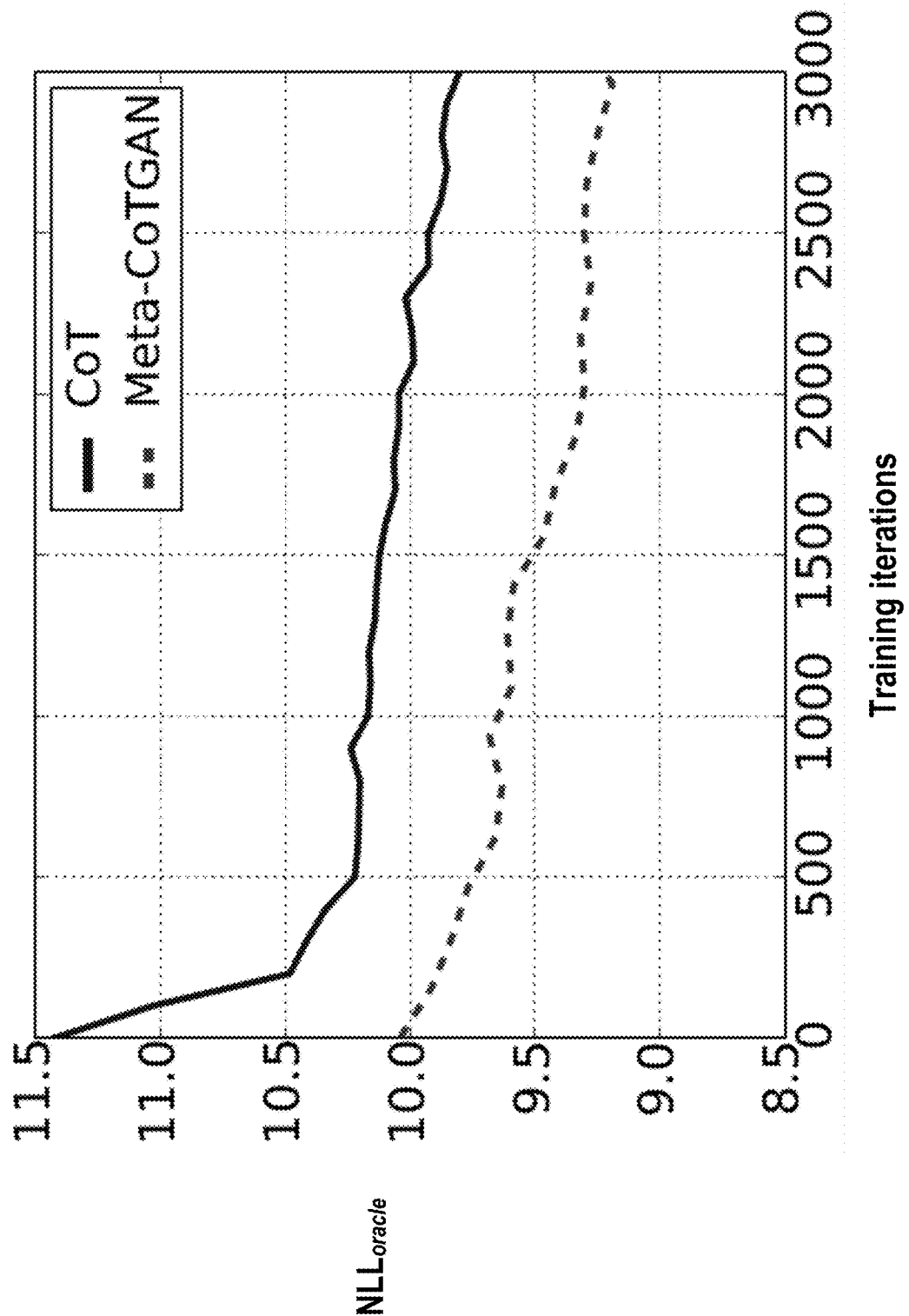
FIG. 7 depicts evaluation result on synthetic oracle with length 20 in terms of $NLL_{oracle}$ loss, according to embodiments of the present disclosure.

It was demonstrated the learning curves for $NLL_{oracle}$ loss in FIG. 7. Overall, the tested model embodiment converged to significantly better standard than CoT. Note that CoT takes no pretraining stage and its $NLL_{oracle}$ loss progressively decreases. The tested method embodiment took a pretraining stage and the loss decreased in both the pretraining stage and the adversarial training stage. It was noticed that upon convergence, the $NLL_{oracle}$ loss for the tested method embodiment was significantly lower than CoT. This demonstrates that the cooperative training mechanism proposed by CoT is not comparable to the tested method embodiment in terms of sample quality. The evaluation scores for $NLL_{oracle}$ and $NLL_{gen}$ are presented in Table 1, below. When comparing $NLL_{gen}$, the tested method embodiment achieved much lower loss scale than CoT. This demonstrates that the method embodiments herein convey greater efficiency in preserving the sample diversity. Overall, considering the inferior performance and long training time of this model, it was not considered further in the following real-world dataset experiments.

TABLE 1

Evaluation result on synthetic oracle
with sequence length 20. For CoT,
their best score for $NLL_{gen}$ is presented.

| Method | $NLL_{oracle}$ | $NLL_{gen}$ |
| --- | --- | --- |
| CoT | 8.19 | 7.54 |
| Meta-CoTGAN Embodiment | 7.69 | 6.86 |

5. Dataset 1

The second evaluation domain was using a real-world dataset, Dataset 1, which involved image captions. The pre-processing method proposed in Yaoming Zhu, Sidi Lu, Lei Zheng, Jiaxian Guo, Weinan Zhang, Jun Wang, and Yong Yu, "Texygen: A Benchmarking Platform for Text Generation Models," in *SIGIR '18: The 41st International ACM SIGIR Conference on Research & Development in Information Retrieval*, June 2018, pages 1097-1100 (which is incorporated by reference herein in its entirety). The training and testing set comprised approximately 10,000 sentences, respectively. The sentences had minimum length of 7 and maximum length of 37. The vocabulary size was approximately 4,700.

The scores of BLEU-2 to BLEU-5 are presented for measuring sample quality, and the $NLL_{gen}$ score for measuring sample diversity in Table 2, which is in FIG. 8. For RelGAN and Meta-CoTGAN, the temperature (in parentheses) is set to be 100 and 1000, and the results are averaged over 6 runs (random seeds). For $NLL_{gen}$ (last column), the smaller the better. Overall, the tested method embodiment demonstrated significant advantage over all the sample quality/diversity metrics. Notably, the tested method embodiment lead to $NLL_{gen}$ loss significantly lower than the other baseline approaches. This indicates that embodiments can provide an efficient control over the mode collapse for the adversarial training and eventually lead to superior sample diversity. While decelerating the mode collapse, the cooperative training may result in a model with better sample quality as well.

Figure 9:
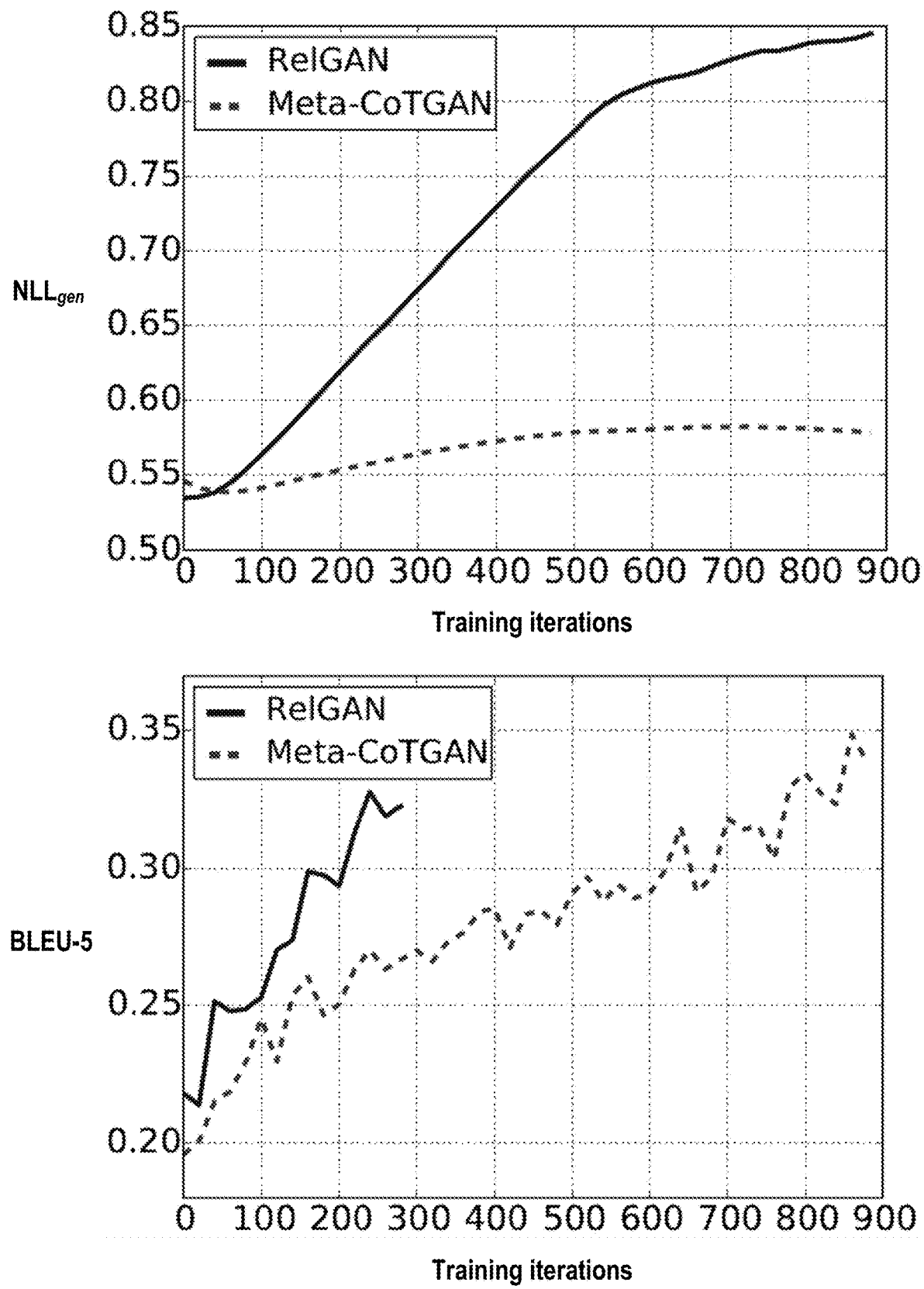
FIG. 9 depicts the $NLL_{gen}$ and BLEU-5 results of a RelGAN and a Meta-CoTGAN embodiment, according to embodiments of the present disclosure.

To further validate this, the learning curves for the sample diversity metric and BLEU-5 as a representative sample quality metric are presented in FIG. 9. FIG. 9 demonstrates the quality-diversity trade-off for the test method embodiment as well as the baseline RelGAN on Dataset 1. The Meta-CoTGAN embodiment progressively achieved better BLEU-5 scores than RelGAN with an apparently slow progress for mode collapse. The BLEU-5 for RelGAN was plotted up to the point when its corresponding $NLL_{gen}$ loss reached its reported standard. Otherwise, the BLEU-5 score becomes no more meaningful since the model has turned into severe mode collapse (i.e., generating repeated sentences).

It was observed that the $NLL_{gen}$ for RelGAN would quickly rise, which is a sign of mode collapse. However, for the Meta-CoTGAN embodiment, progresses rather slowly. It shows that methodology embodiments herein can efficiently decelerate mode collapse and control the $NLL_{gen}$ loss from explode. When investigating on the sample quality metric, it was observed that the BLEU-5 score for RelGAN would go up faster than the Meta-CoTGAN embodiment. But eventually, the tested model embodiment achieved a significantly higher standard than RelGAN. Also, it was observed that when $NLL_{gen}$ for RelGAN exploded (e.g., after 400 epochs), the repeat rate was rather high and therefore the generator just becomes useless. However, the test method embodiment preserved much better diversity. Also, it was observed from the generated real sentences that the tested model embodiment can generate quite long sentences, while most of the GAN models fall short.

6. Dataset 2

The third evaluation domain was another dataset, Dataset 2, which had a size that was much larger than Dataset 1. Dataset 2 comprised a training set of 270,000 sentences and a testing set of 10,000 sentences. The sentences had maximum length of 51, and the vocabulary size was approximately 5,250. The results using Dataset 2 are presented in Table 3, which is in FIG. 10.

It can be seen that the tested Meta-CoTGAN embodiment consistently outperformed all baselines in terms of all the BLEU metrics and $NLL_{gen}$. Under the temperature setting of 100, the tested method embodiment outperformed the strong RelGAN baseline by 0.041/0.039 on BLEU-4/BLEU-5. Noticeably, the best BLEU scores for the tested method embodiment were obtained when the $NLL_{gen}$ loss was at a significantly lower level than RelGAN. This indicates that by conducting cooperative training, a generator model could be derived with better sample quality and sample diversity simultaneously. Moreover, it shows that embodiments can robustly perform well in rather challenging and diverse real-world datasets. Meanwhile, the performance of the tested method embodiment was quite robust, consistently outperforming Rel-GAN under both temperature settings, over all the evaluation metrics. By investigating through the generated real samples, it was observed that the generated sentences conveyed rather diverse semantics and the output comprised considerably long sentences, unlike the conventional adversarial text generators that would shortly fall to the phase of generating short and repeated sentences.

E. Ablation Study

1. Impact of Cooperative Training Language Model

In the section, the impact of using an online updated language model to conduct an embodiment of the cooperative training process is demonstrated. To this end, a direct comparison was to use a pretrained language model not updated with cooperative training. We denote such baseline as Meta-CoTGAN$^{cot\text{-}off}$. The results on Dataset 1 are presented in Table 4, which is in FIG. 11. It was observed that when online update to the language model was turned off, the model still preserved comparable sample diversity in terms of $NLL_{gen}$, since the cooperative training loss was still employed on the real data. However, under both temperature setting, the sample quality metrics did not perform as well as the full set of the test method embodiment. This shows that it is beneficial to update the language model jointly with the generator to let it offer a smoothly changing target distribution to the generator.

2. Impact of Meta Optimization

The impact of the meta optimization setup was also evaluated. To this end, an embodiment was compared with a principled way of engaging the cooperative training loss for optimizing the generator parameters, which was proposed in the form of linearly summing up the adversarial loss and the cooperative training loss in a weighted manner, i.e., $\mathcal{L}_{adv}(\theta)+\lambda\mathcal{L}_{cot}(\theta)$. This baseline was denoted as Meta-CoTGAN$^{meta\text{-}off}$. The results are shown in Table 4 (FIG. 11). Overall, Meta-CoTGAN$^{meta\text{-}off}$ obtain comparable scores for $NLL_{gen}$. However, its performance in terms of the sample quality metrics was still more inferior than using full set of solution. Thus, it may be concluded that meta optimization is an important ingredient for balancing the quality-diversity trade-off. Intuitively, the meta optimization set-up embodiments offer an efficient way to ensure the generator parameters after the adversarial update would decelerate from mode collapse, which is important to derive the superior performance.

F. Some Conclusions

Presented herein were embodiments of a meta cooperative training approach to facilitate the training of adversarial generation models. Embodiments utilize a cooperatively trained second model (e.g., a language model) to effectively decelerate the mode collapse of adversarial training via distilling the prediction output distribution of the second model over the real data to the adversarial generator model. An embodiment of proposed methodology was evaluated using both synthetic dataset and two real-world datasets with sequence length at a range from 7 to 51. As a result, the tested methodology consistently outperformed the baseline algorithms on sample quality metrics and sample diversity metric simultaneously. The methodology embodiments are general and may be applied with distinct RL-based or RL-free adversarial text generation algorithms that face the issue of mode collapse. Embodiments of meta cooperative training may also be applied on or adapted to more emerging RL-based/free GAN models.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, stylus, touchscreen and/or video display. The computing system may also include one or more buses operable to transmit communications between the various hardware components.

Figure 12:
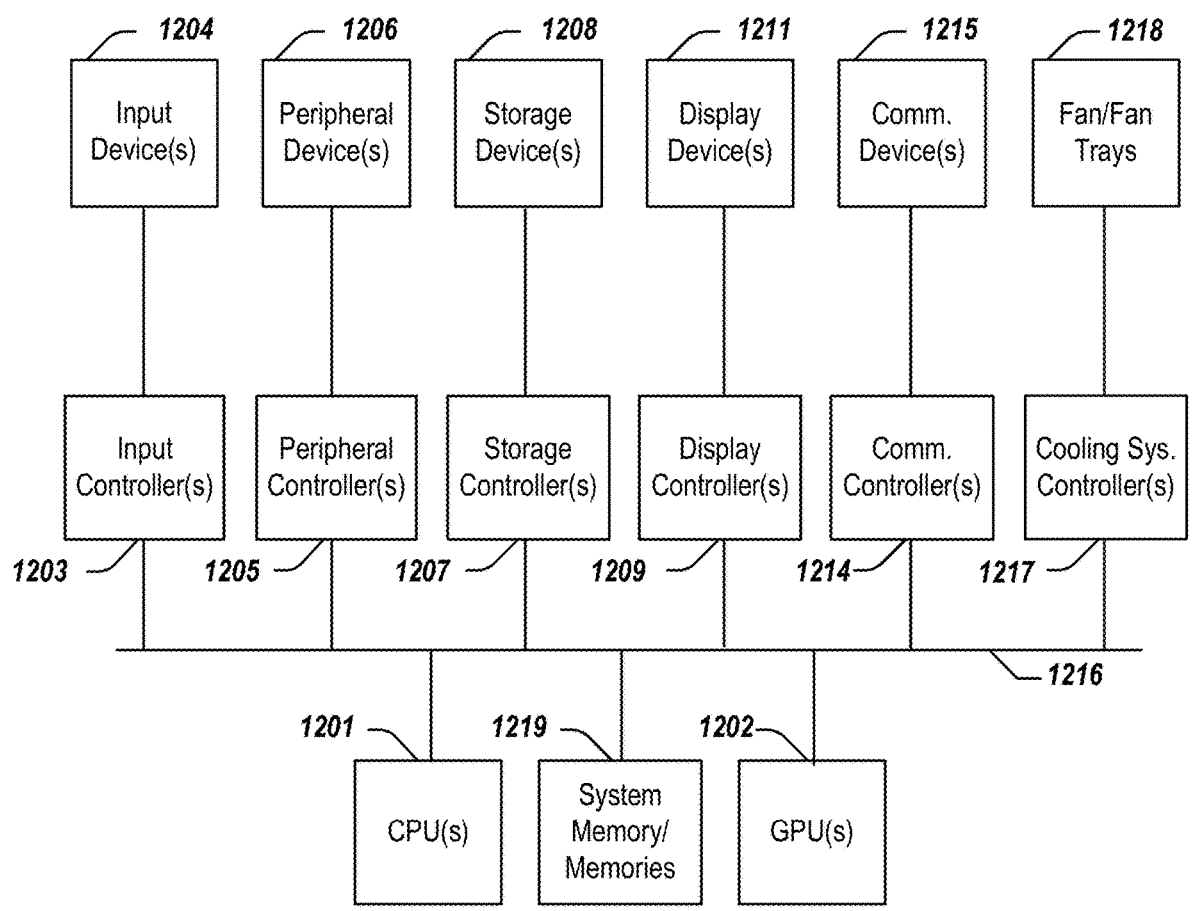
FIG. 12 depicts a simplified block diagram of a computing device/information handling system, according to embodiments of the present disclosure.

FIG. 12 depicts a simplified block diagram of an information handling system (or computing system), according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more central processing units (CPU) 1201 that provides computing resources and controls the computer. CPU 1201 may be implemented with a microprocessor or the like, and may also include one or more graphics processing units (GPU) 1202 and/or a floating-point coprocessor for mathematical computations. In one or more embodiments, one or more GPUs 1202 may be incorporated within the display controller 1209, such as part of a graphics card or cards. The system 1200 may also include a system memory 1219, which may comprise RAM, ROM, or both.

A number of controllers and peripheral devices may also be provided, as shown in FIG. 12. An input controller 1203 represents an interface to various input device(s) 1204, such as a keyboard, mouse, touchscreen, and/or stylus. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT) display, a thin film transistor (TFT) display, organic light-emitting diode, electroluminescent panel, plasma panel, or any other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1200 comprises one or more fans or fan trays 1218 and a cooling subsystem controller or controllers 1217 that monitors thermal temperature(s) of the system 1200 (or components thereof) and operates the fans/fan trays 1218 to help regulate the temperature.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a generator comprising:
responsive to a stop condition having not been reached, performing steps comprising:
sampling a set of data from a training data;
using a generator model, which comprises a set of generator parameter values, to generate a set of generated data;
computing an adversarial loss for the generator model using an adversarial training loss function;
determining a set of intermediate generator parameter values for the generator model using the adversarial loss and gradient descent;
using a set of data sampled from the training data as inputs:

into a second neural network model, which comprises a second neural network model set of parameter values, to obtain one or more output distributions from the second neural network model; and into the generator model comprising the set of intermediate generator parameter values to obtain one or more output distributions from the generator model;

determining a meta gradient for a cooperate training loss that comprises comparing one or more output distributions from the second neural network model with one or more corresponding output distributions from the generator model;

updating a set of generator parameter values using an adversarial gradient, which is obtained using the adversarial loss for the generator model, and the meta gradient;

updating a set of discriminator parameter values for a discriminator model using an adversarial loss for the discriminator model; and updating the second neural network model set of parameter values of the second neural network model using a cooperative training loss for the second neural network model; and responsive to the stop condition having been reached, outputting the generator model, which comprises a final updated set of generator parameter values.

2. The computer-implemented method of claim 1 further comprising as initial steps:

initializing at least the set of generator parameter values of the generator model and the set of discriminator parameter values of the discriminator model; and pretraining the generator model using training data, the generator model, and the discriminator model.

3. The computer-implemented method of claim 2 wherein the second neural network model and the generator model share a same neural network structure and the method further comprises:

using at least some of the set of generator parameter values from the pretrained generator model as parameter values for the second neural network model.

4. The computer-implemented method of claim 1 wherein the step of updating the second neural network model set of parameter values of the second neural network model using a cooperative training loss comprises:

using a maximum likelihood estimation (MLE) loss function.

5. The computer-implemented method of claim 4 wherein the step of updating the second neural network model set of parameter values of the second neural network model using a cooperative training loss comprises:

minimizing Kullback-Leibler divergence between:
one or more outputs from the second neural network model using a set of data sampled from the training data; and
one or more outputs from the second neural network model using a mixture of data sampled from the training data and data sampled from data that were generated by the generator model.

6. The computer-implemented method of claim 5 wherein the mixture comprises an equal number or approximately equal number of data from the training data and data points which were generated by the generator model.

7. The computer-implemented method of claim 1 wherein the adversarial loss for the discriminator model and the adversarial loss for the generator model are obtained by using a min-max loss function.

8. A system comprising:
one or more processors; and
a non-transitory computer-readable medium or media comprising one or more sets of instructions which, when executed by at least one of the one or more processors, causes steps to be performed comprising:
responsive to a stop condition having not been reached, performing steps comprising:
sampling a set of data from a training data having a first distribution;
using a generator model, which comprises a set of generator parameter values, to generate a set of generated data;
computing an adversarial loss for the generator model using an adversarial training loss function;
determining a set of intermediate generator parameter values for the generator model using the adversarial loss and gradient descent;
using a set of data sampled from the training data as inputs:
into a second neural network model, which comprises a second neural network model set of parameter values, to obtain one or more output distributions from the second neural network model; and
into the generator model comprising the set of intermediate generator parameter values to obtain one or more output distributions from the generator model;
determining a meta gradient for a cooperate training loss that comprises comparing one or more output distributions from the second neural network model with one or more corresponding output distributions from the generator model;
updating a set of generator parameter values using an adversarial gradient, which is obtained using the adversarial loss for the generator model, and the meta gradient;
updating a set of discriminator parameter values for a discriminator model using an adversarial loss for the discriminator model; and
updating the second neural network model set of parameter values of the second neural network model using a cooperative training loss for the second neural network model; and
responsive to the stop condition having been reached, outputting the generator model, which comprises a final updated set of generator parameter values.

9. The system of claim 8 wherein the non-transitory computer-readable medium or media further comprises one or more sets of instructions which, when executed by at least one of the one or more processors, causes steps to be performed comprising:

initializing at least the set of generator parameter values of the generator model and the set of discriminator parameter values of the discriminator model; and pretraining the generator model using training data, the generator model, and the discriminator model.

10. The system of claim 9 wherein the second neural network model and the generator model share a same neural network structure and the non-transitory computer-readable medium or media further comprises one or more sets of instructions which, when executed by at least one of the one or more processors, causes steps to be performed comprising:

using at least some of the set of generator parameter values from the pretrained generator model as parameter values for the second neural network model.

11. The system of claim 8 wherein the step of updating the second neural network model set of parameter values of the second neural network model using a cooperative training loss comprises:
using a maximum likelihood estimation (MLE) loss function.

12. The system of claim 11 wherein the step of updating the second neural network model set of parameter values of the second neural network model using a cooperative training loss comprises:
minimizing Kullback-Leibler divergence between:
one or more outputs from the second neural network model using a set of data sampled from the training data; and
one or more outputs from the second neural network model using a mixture of data sampled from the training data and data sampled from data that were generated by the generator model.

13. The system of claim 12 wherein the mixture comprises an equal number or approximately equal number of data from the training data and data which were generated by the generator model.

14. The system of claim 8 wherein the adversarial loss for the discriminator model and the adversarial loss for the generator model are obtained by using a min-max loss function.

15. A computer-implemented method for training a generator comprising:
responsive to a stop condition having not been reached, performing steps comprising:
generating a set of generated data using a set of data from a training dataset comprising real data and a generator model from a generative adversarial system comprising the generator model having a set of generator model parameter values and a discriminator model having a set of discriminator parameter values;
computing an adversarial loss for the generator model using an adversarial training loss function;
determining a set of intermediate generator parameter values for the generator model using the adversarial loss and gradient descent;
using the generator model with the set of intermediate generator parameter values and a second neural network model to cooperatively train the generator model to decelerate mode collapse of the generator model, in which cooperative training comprises relating one or more output distributions of the generator model with one or more corresponding output distributions of the second neural network model;
updating a set of discriminator parameter values for the discriminator model using an adversarial loss for the discriminator model; and
updating a set of parameter values for the second neural network model using a cooperative training loss for the second neural network model; and
responsive to the stop condition having been reached, outputting the generator model;
wherein the step of using the generator model with the set of intermediate generator parameter values and a second neural network model to cooperatively train the generator model to decelerate mode collapse of the generator model comprises:
computing a cooperative training loss for the generator model using the set of data sampled from the training dataset comprising real data as inputs into the second neural network model and into the generator model comprising the set of intermediate generator parameter values;
determining a meta gradient using the cooperate training loss for the generator model; and
updating the set of generator parameter values using an adversarial gradient, which is obtained using the adversarial loss for the generator model, and the meta gradient.

16. The computer-implemented method of claim 15 further comprising as initial steps:
initializing at least the set of generator parameter values of the generator model and the set of discriminator parameter values of the discriminator model;
pretraining the generator model using training data and the generator model and the discriminator model; and
using at least some of the set of generator parameter values from the pretrained generator model as parameter values for the second neural network model.

17. The computer-implemented method of claim 15 wherein the generator is a natural language text generator and the second neural network model is a language model.

18. The computer-implemented method of claim 15 wherein the step of updating the second neural network model set of parameter values of the second neural network model using a cooperative training loss comprises:
minimizing Kullback-Leibler divergence between:
one or more output distributions from the second neural network model using the set of data sampled from the training dataset comprising real data, and
one or more output distributions from the second neural network model using a mixture of data sampled from the training dataset comprising real data and data sampled from data that were generated by the generator model.

19. The computer-implemented method of claim 18 wherein the mixture comprises an equal number or approximately equal number of data from the training dataset and data which were generated by the generator model.

20. A system comprising:
one or more processors; and
a non-transitory computer-readable medium or media comprising one or more sets of instructions which, when executed by at least one of the one or more processors, causes steps to be performed comprising:
responsive to a stop condition having not been reached, performing steps comprising:
generating a set of generated data using a set of data from a training dataset comprising real data and a generator model from a generative adversarial system comprising the generator model having a set of generator model parameter values and a discriminator model having a set of discriminator parameter values;
computing an adversarial loss for the generator model using an adversarial training loss function;
determining a set of intermediate generator parameter values for the generator model using the adversarial loss and gradient descent;
using the generator model with the set of intermediate generator parameter values and a second neural network model to cooperatively train the generator model to decelerate mode collapse of the generator model, in which cooperative training comprises relating one or more output distributions of the generator model with one or more corresponding output distributions of the second neural network model;

updating a set of discriminator parameter values for the discriminator model using an adversarial loss for the discriminator model; and updating a set of parameter values for the second neural network model using a cooperative training loss for the second neural network model; and responsive to the stop condition having been reached, outputting the generator model;

wherein the step of using the generator model with the set of intermediate generator parameter values and a second neural network model to cooperatively train the generator model to decelerate mode collapse of the generator model comprises:

computing a cooperative training loss for the generator model using the set of data sampled from the training dataset comprising real data as inputs into the second neural network model and into the generator model comprising the set of intermediate generator parameter values;

determining a meta gradient using the cooperate training loss for the generator model; and updating the set of generator parameter values using an adversarial gradient, which is obtained using the adversarial loss for the generator model, and the meta gradient.

21. The system of claim 20 wherein the step of updating the second neural network model set of parameter values of the second neural network model using a cooperative training loss comprises:

minimizing Kullback-Leibler divergence between the second neural network model using the set of data sampled from the training dataset comprising real data and the second neural network model using a mixture of data sampled from the training dataset comprising real data and data sampled from data that were generated by the generator model.

* * * * *